Figure 8:
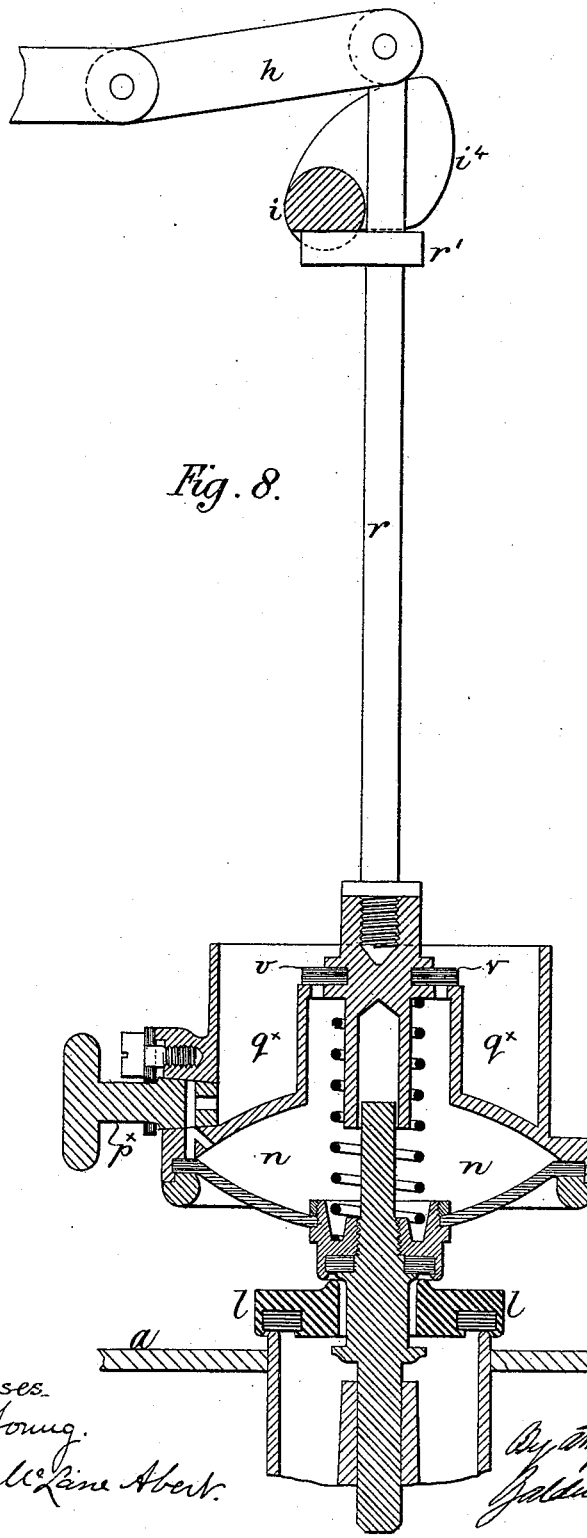

(No Model.) 6 Sheets—Sheet 1.
G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES, &c.
No. 326,432. Patented Sept. 15, 1885.
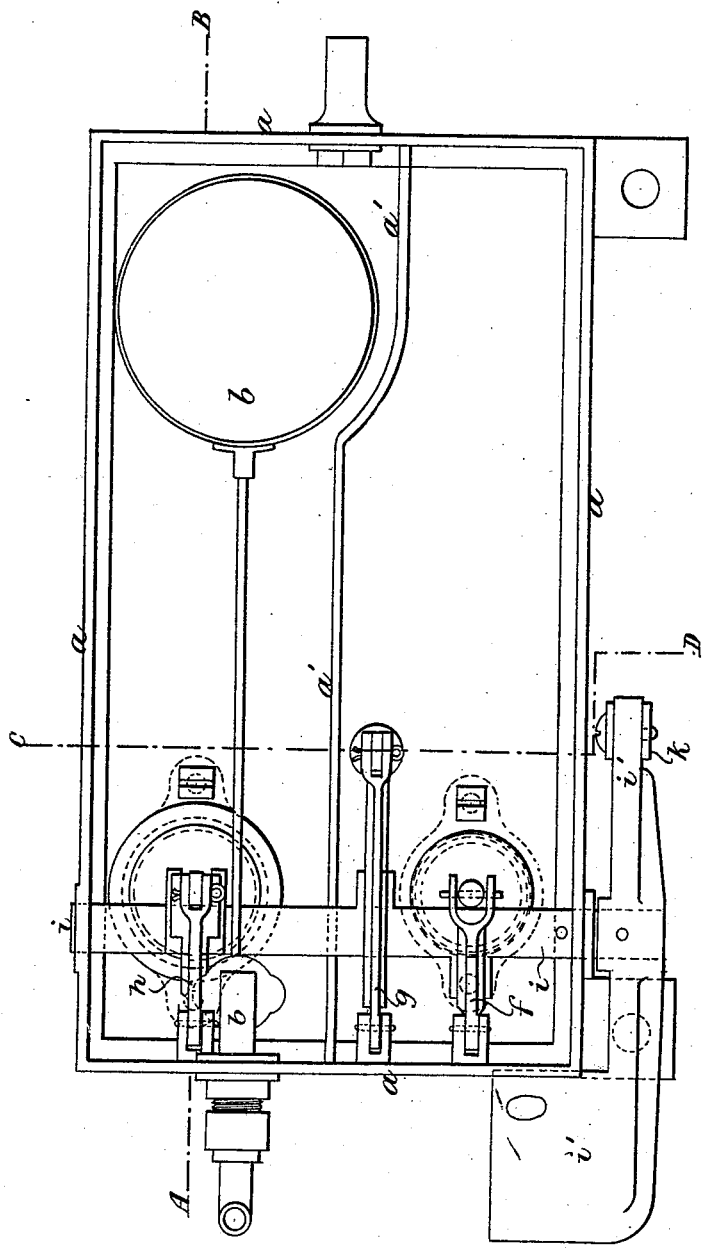

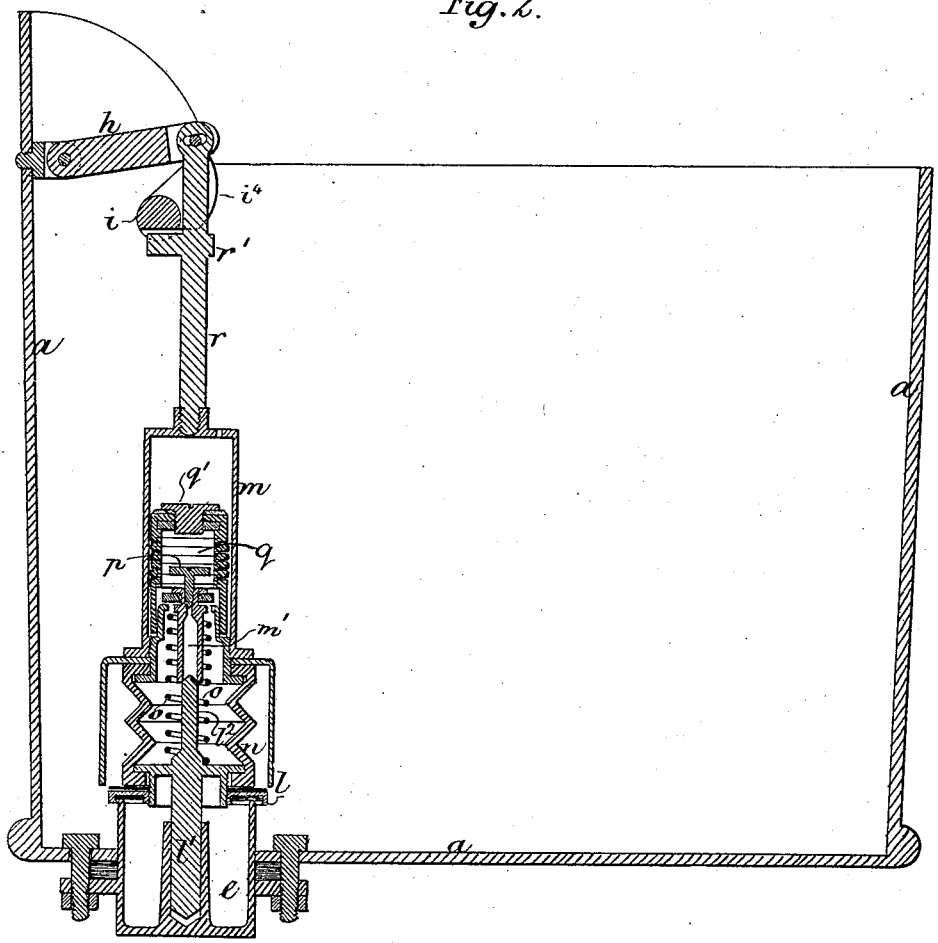

(No Model.) 6 Sheets—Sheet 3.
G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES, &c.
No. 326,432. Patented Sept. 15, 1885.
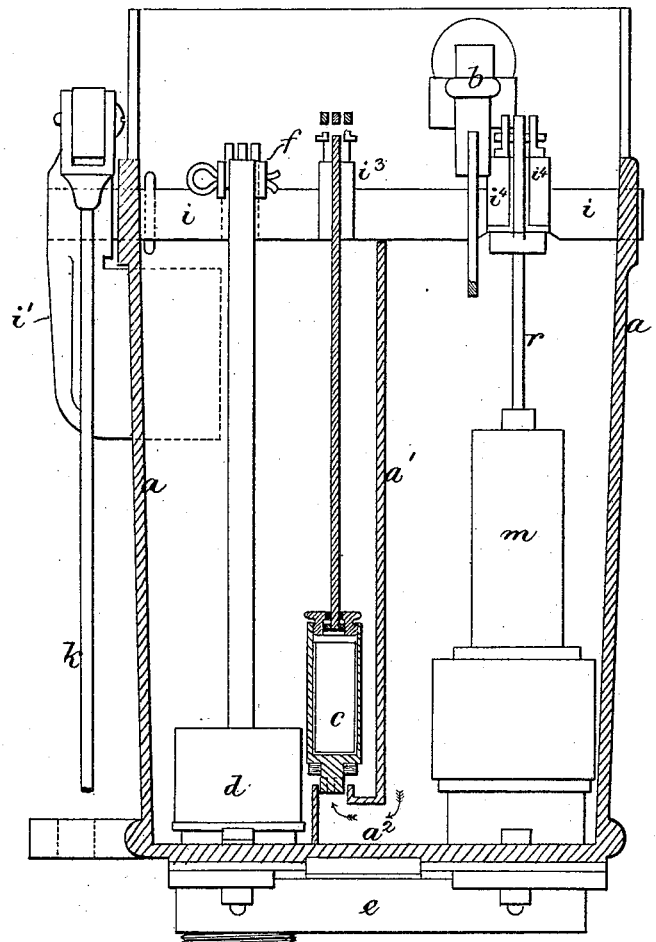
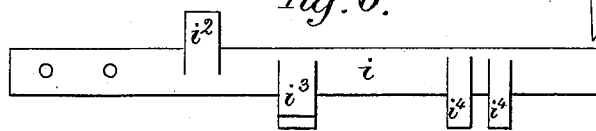
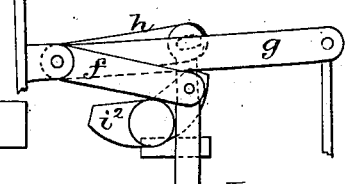
Witnesses.
James Young.
Allan McLane Abert.
Inventors.
G. H. Jennings.
S. Jennings.
J. Morley.

(No Model.) 6 Sheets—Sheet 4.
G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES, &c.
No. 326,432. Patented Sept. 15, 1885.
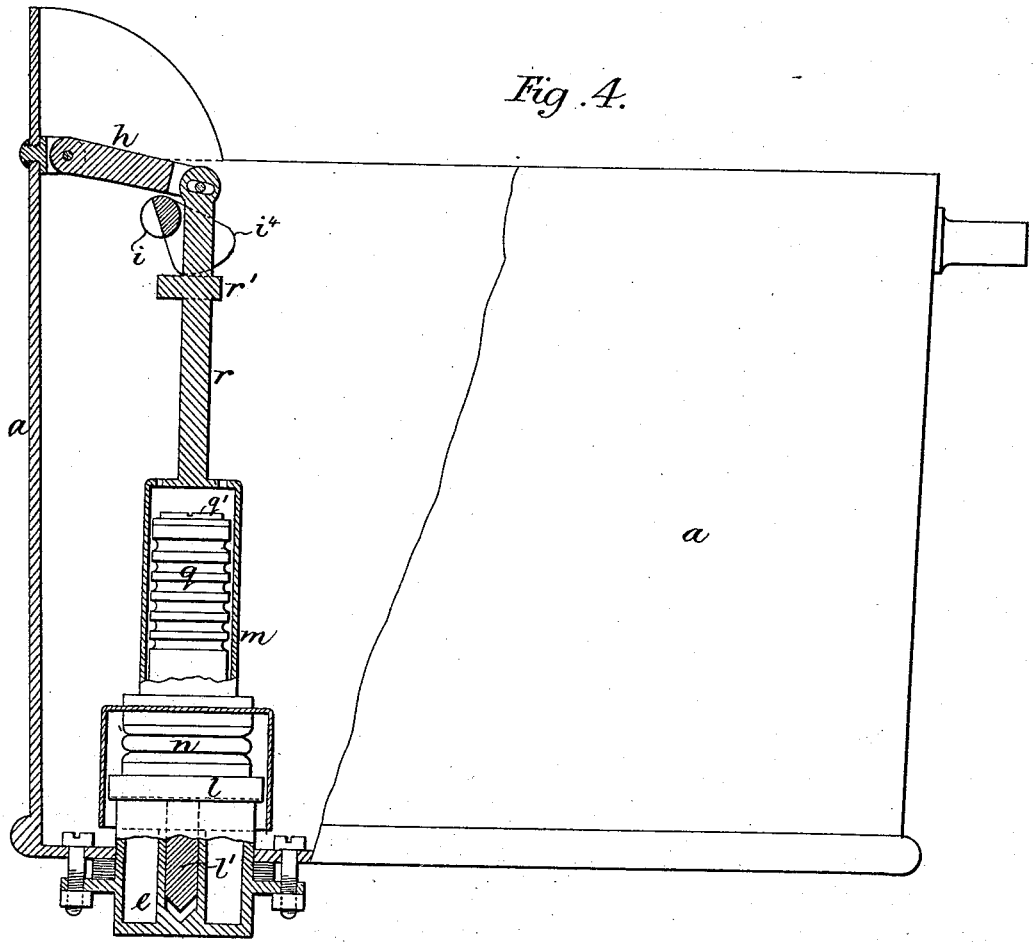

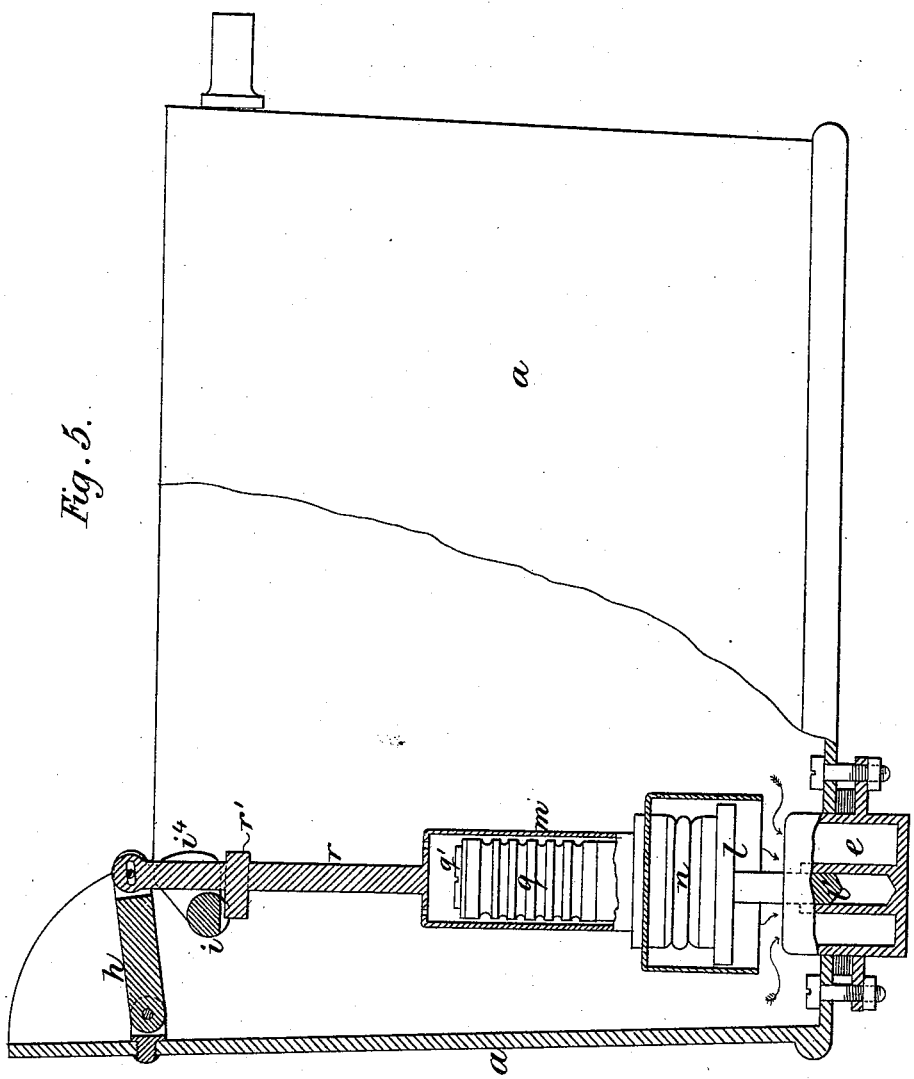

(No Model.) 6 Sheets—Sheet 6.

G. H. & S. JENNINGS & J. MORLEY.
APPLIANCE AND ARRANGEMENT FOR CONTROLLING, REGULATING, AND ARRESTING THE SUPPLY OF WATER FOR SANITARY PURPOSES, &c.

No. 326,432. Patented Sept. 15, 1885.

Witnesses
James Young.
Allan McLane Abert.

Inventors

UNITED STATES PATENT OFFICE.

GEORGE HENRY JENNINGS AND SIDNEY JENNINGS, OF PALACE ROAD, LAMBETH, COUNTY OF SURREY, AND JOHN MORLEY, OF BETHNAL GREEN ROAD, COUNTY OF MIDDLESEX, ENGLAND.

APPLIANCES AND ARRANGEMENTS FOR CONTROLLING, REGULATING, AND ARRESTING THE SUPPLY OF WATER FOR SANITARY PURPOSES, &c.

SPECIFICATION forming part of Letters Patent No. 326,432, dated September 15, 1885.

Application filed September 30, 1884. (No model.) Patented in England June 28, 1884, No. 11,315.

*To all whom it may concern:*

Be it known that we, GEORGE HENRY JENNINGS and SIDNEY JENNINGS, both of Palace Road, Lambeth, in the county of Surrey, England, sanitary engineers, and JOHN MORLEY, of 258 Bethnal Green Road, in the county of Middlesex, England, brass-finisher, subjects of the Queen of Great Britain, have invented certain new and useful Improvements in Appliances and Arrangements for Controlling, Regulating, and Arresting the Supply of Water for Sanitary Purposes and Preventing Waste, (for which we have obtained Letters Patent in Great Britain, No. 11,315, dated June 28, 1884,) of which the following is a specification.

This invention has for its object improvements in appliances and arrangements for controlling, regulating, and arresting the supply of water for sanitary purposes and preventing waste.

Our invention relates to improvements applicable especially in those cases in which a measured quantity of water is required to be delivered in two separate flows, the first flow being determined by the movement of a lever or handle, and the second or after flow being determined by the release of the said lever or handle.

In accordance with our improvements we employ, as heretofore, a measuring-cistern, which is divided into two parts by a partition. The two parts communicate by a passage through the lower part of the partition, in connection with which passage a valve is provided. In one of the compartments of the cistern a ball-valve is fitted for filling the measuring-cistern from a main or from a cistern of larger capacity. The other compartment of the cistern, also, has an opening in the bottom provided with a valve, which, when lifted, permits the water to escape and be delivered from this compartment into the delivery-pipe.

There is a horizontal valve-controlling axis passing through the cistern from side to side at its upper part, and cams or projections on this axis operate the several valves hereinafter mentioned. The valve-controlling axis has a lever upon it weighted at one end, and to the other end a draw-rod is attached. When this rod is pulled downward, the apparatus is set in action, and when it is allowed to return by the action of the weight the second quantity of water, or the after flow is delivered.

When the apparatus is at rest, the valve by which one compartment of the cistern communicates with the other is open. When the axis, with the tappets upon it, is rotated by the downward pull of the draw-rod, it operates to close the valve by which one compartment of the cistern communicates with the other. The valve connecting the latter compartment of the cistern with the delivery-pipe is now opened by its appropriate tappet, and the first flow of water takes place and continues until the lever or handle is released, or until this compartment of the cistern is empty. When the weighted lever and its axis, with the tappets upon it, is allowed to return, the valve by which the main flow is delivered closes.

The improved arrangement to produce the after flow remains to be described. For this purpose the compartment of the cistern which receives the supply is provided with automatic delivery-valve apparatus of the following construction, which, in combination with the mechanism above referred to and not herein claimed *per se*, constitutes our present invention: A disk or valve covers the passage between this compartment of the cistern and the delivery-pipe. This is attached to the under side of a collapsible vessel, which may be of india-rubber and of a form resembling an accordion. From the top of the collapsible vessel a rod passes upward to one of the tappets upon the horizontal axis. When this axis is rotated for the purpose of setting the apparatus into operation, it causes the main flow to be delivered, as already described, and it also pushes down the rod. The valve being already upon its seat, the movement causes the collapsible vessel to be compressed, and the water or fluid which it contains is compelled to pass out through a valve into another similar vessel serving as a receiver. When the first flow of water has been delivered and the axis is allowed to return, the second or after flow results from the upward movement of the rod to which the collapsible vessel and valve are attached—a movement resulting from the action of a tappet on the axis. The water or fluid displaced from the collapsible vessel is not able to return at once when the upward movement of the rod takes place, and as consequently this vessel cannot resume its original dimensions, the valve attached to it is lifted from its seat as the rod moves upward, and the water is then delivered from this compartment of the cistern. After a short time, however, the valve returns to its seat, the collapsible vessel becoming distended by the return to it through a small regulated aperture of the water or fluid it originally contained.

In place of the accordion-like vessel of india-rubber of the automatic delivery-valve apparatus above described, a metal vessel with a flexible bottom consisting of a disk of india-rubber or like material may be employed.

In order that our said invention may be most fully understood and readily carried into effect, we will proceed to describe the drawings hereunto annexed.

In the drawings, Figure 1 is a plan of an apparatus constructed according to our invention. Fig. 2 is a longitudinal section on the line A B in Fig. 1. Fig. 3 is a transverse section on the line C D in Fig. 1. Figs. 4 and 5 are sectional elevations showing, especially, the automatic delivery-valve apparatus in two positions. Fig. 6 is a plan of the axis and tappets by which the valves are operated. Fig. 7 is an end view of this axis, and shows also other parts in connection therewith. Fig. 8 shows in section an alternative form of automatic delivery-valve apparatus.

$a\ a$ is a small cistern divided by the partition $a'$ into two compartments.

$a^2$ is a passage by which water is able to pass from one compartment to the other.

$b$ is an ordinary ball-valve by which the cistern is filled from a main or other source.

$c$ is a valve which controls the passage $a^2$ by which the cistern-compartments communicate.

$d$ is the delivery-valve which first opens. It is an ordinary lift-valve, and when raised it permits water to flow from one compartment of the cistern into the outlet-passage and pipe $e$, which is connected with the pan of a water-closet or other place where the water is required. In the other compartment of the cistern there is another delivery-valve, which also, when lifted, admits water to the outlet $e$.

$f$, $g$, and $h$ are three levers mounted within the cistern $a$, and beneath them the horizontal axis $i$ passes from side to side of the cistern. The axis $i$ has fixed upon it at its end the weighted lever $i'$, and to the end of this lever, opposite that which is weighted, the draw-rod $k$ is connected. When the draw-rod is pulled down, the axis $i$ turns partly round, and when the draw-rod is released the weight causes the axis to return. The movement in either direction is limited by the weight coming into contact with the end of the cistern.

India-rubber pads are provided on the weight to prevent noise.

The valve $d$ is connected with the lever $f$ by a rod jointed at its upper end to the lever. The valve $c$ is similarly connected with the lever $g$, and the valve which delivers the after flow with the lever $h$.

$i^2$, $i^3$, and $i^4$ are corresponding tappets.

When the draw-rod $k$ is pulled down, the tappet $i^3$ ceases to support the lever $g$, and the valve $c$ falls to its seat, closing the passage between the two compartments; also, the tappet $i^2$ raises the lever $f$ and the valve $d$ and the main flow is discharged.

The after flow is given when the draw-rod is released and the axis returns, and this is effected by automatic delivery-valve apparatus as follows:

$l$ is a valve-disk seating itself over the aperture by which the after-flow is delivered into the outlet $e$. It is connected with the under side of the cylindrical case $m$ by means of the india-rubber collapsible vessel $n$.

$l'\ l^2$ are guide-stems on the valve-disk, one entering a socket below the valve and the other passing into a socket, $m'$, in the bottom of the case $m$.

$o$ is a coiled spring tending to expand the vessel $n$. This vessel contains water or other liquid, which, however, is able to pass out by a small orifice at the upper end of the socket $m'$. This orifice can be more or less closed by means of a screw, $p$.

$q$ is another collapsible vessel within the cylindrical case $m$. It serves only to receive the liquid escaping from the vessel $n$, and to retain it until it returns.

$q'$ is a screw-plug in the cover of the vessel $q$. It can be removed to give access to the screw $p$.

When the draw-rod $k$ is pulled down, the tappet $i^4$ on the axis $i$ presses against the shoulder $r'$ on the rod $r$. It pushes it down, overcoming the spring $o$, and collapsing the vessel $n$, expelling liquid from its interior. When the draw-rod is released and the axis returns, the tappet $i^4$ lifts the lever $h$ and the rod $r$, which is jointed to this lever. This movement takes place more rapidly than the vessel $n$ can be expanded by being refilled with liquid returning past the screw $p$, and so regain its form; hence the valve-disk $l$ now rises from its seat and water, for the after flow passes from the cistern to the outlet $e$. Soon, however, the vessel $n$ refills, the disk $l$, drops automatically to its seat by the expansion of the valve-apparatus, and no more water is drawn off until the draw-rod again moves the axis $i$.

By the use of the second collapsible vessel $q$ the small orifice regulated by the screw $p$ is protected, so that it cannot become stopped by solid matter carried into the cistern with the supply; but this precaution is not always necessary, and in such cases the collapsible vessel $n$ may be allowed to fill from and discharge into the cistern.

The arrangement shown by Fig. 8 may also be employed. Here the under side of the vessel $n$ alone is of india-rubber and flexible. The liquid is forced out through a valve, $v$, into a receiver, $q^\times$, above which it may be provided with a cover. The return is regulated by a stop-cock, $p^\times$.

Having now particularly described and ascertained the nature of our said invention, and in what manner the same is to be performed, we declare that what we claim is—

1. The combination of the divided cistern having the communicating passage between its compartments, the valve in said passage, the delivery-valve by which water is discharged from one of said compartments, the automatic delivery-valve apparatus by which, when collapsed, water is discharged from the other compartment after the flow from the first compartment has been arrested, and the valve actuating and controlling axis by connections with which the valve of the communicating passage and the delivery-valve are actuated, and the automatic delivery-valve apparatus compressed to insure the after flow preparatory to the automatic expansion of this apparatus to stop said flow, substantially as and for the purpose set forth.

2. The combination of the cistern, the partition dividing it into two compartments and having the passage and valve, the ball-valve regulating the supply of water to the cistern, the delivery-valve and the automatic delivery-valve apparatus for the respective compartments of the cistern, and the valve-actuating and controlling apparatus, subsequent to the operation of which the automatic-valve apparatus acts by expansion to cut off the after flow, substantially as and for the purpose set forth.

GEORGE HENRY JENNINGS.
SIDNEY JENNINGS.
JOHN MORLEY.

Witnesses:
CARL NEUMANN,
Palace Wharf, Stangate, Lambeth, London, Clerk.
J. WILMER M. HARRIS,
Notary Public, 17 Gracechurch Street, London, E. C.